Patented Jan. 2, 1934

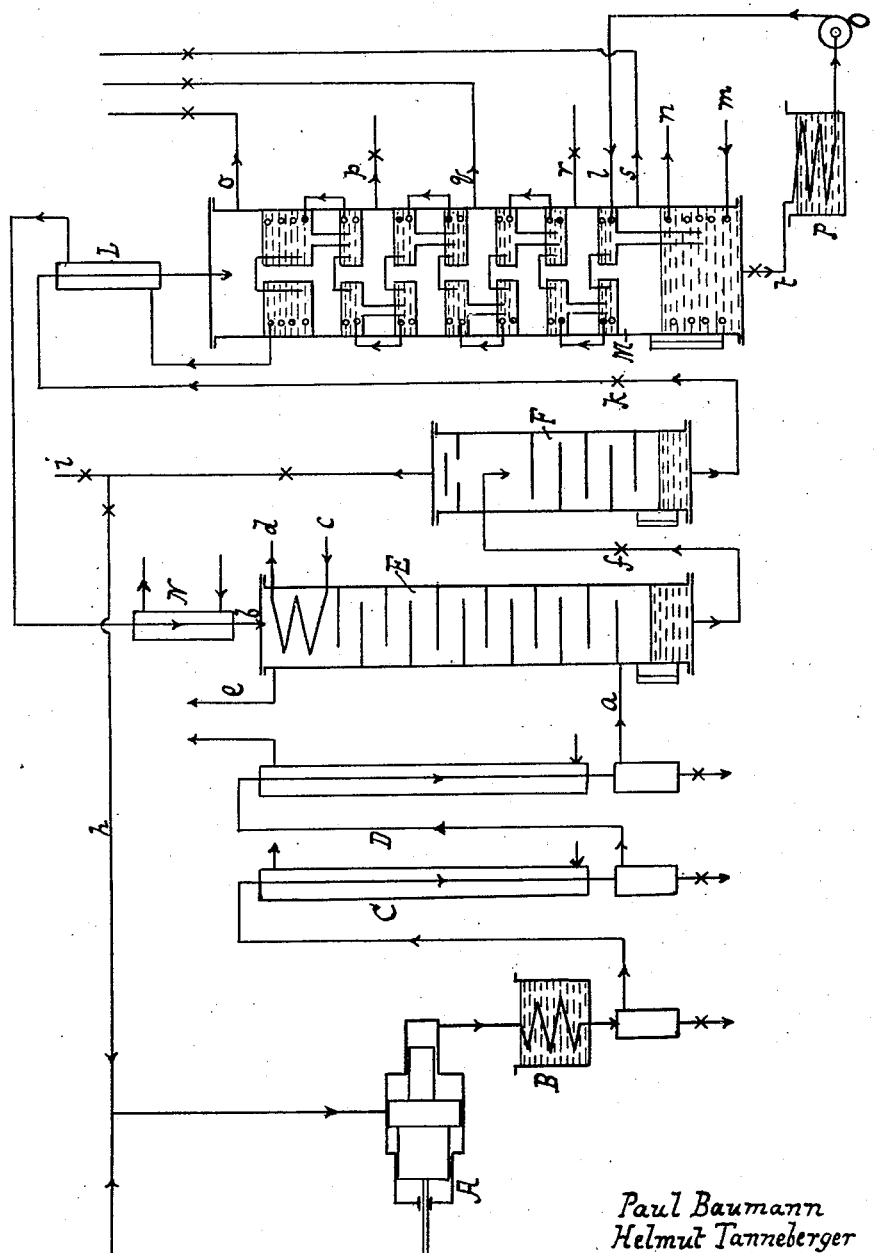

1,942,131

UNITED STATES PATENT OFFICE 1,942,131

SEPARATION OF GAS MIXTURES

Paul Baumann, Ludwigshafen-on-the-Rhine, Helmut Tanneberger, Mannheim, and Heinrich Schilling, Ludwigshafen-on-the-Rhine, Germany, assignors to I. G. Farbenindustrie Aktiengesellschaft, Frankfort - on - the - Main, Germany Application January 24, 1931, Serial No. 511,076, and in Germany March 8, 1930

3 Claims. (Cl. 260—170)

The present invention relates to the separation from gas mixtures of substances which have a high vapour pressure at their melting point.

It has already been proposed to remove substances the vapour pressure of which at their melting point is higher than atmospheric pressure, as for example carbon dioxide, acetylene and the like, from gas mixtures by treating the same, if desired under pressure, with a solvent and recovering the dissolved substance contaminated with the other gases contained in the original gas mixture by fractionally releasing the pressure on the solution in some cases while heating. A more extensive purification of constituents which have a high vapour pressure at their melting point can be carried out for example by fractional distillation and rectification of the liquefied gas mixture under pressures at which these substances are volatilized at a temperature lying substantially above their triple point. By triple point is meant that temperature at which a substance being under its own vapour pressure may exist at the same time in the liquid and in the solid phase. The said fractional distillation and rectification is not directly possible, however, because by reason of the great solubility of these substances in the accompanying substances the distillation and rectification must be carried out at pressures as low as possible, as for example atmospheric pressure, and moreover because, for example with strongly unsaturated hydrocarbons, the carrying out of a separation under pressure may be dangerous by reason of the possibility of decompositions. The employment of fractional distillation and rectification at low temperatures, as for example at pressures below the vapour pressure of the substance or substances at the melting point, is impossible because these substances are then present in the solid form.

We have now found that the said difficulties are obviated by treating the gas mixture to be separated with a solvent capable of dissolving the substances to be recovered at a temperature which is below the triple point of said substances if desired, under pressures for example of several atmospheres, the solvent, if desired after releasing the pressure whereby a part of the gases, as for example hydrogen, nitrogen and the like escapes, being slowly heated, preferably in stages, and the evolved gases collected separately. In this manner the dissolved substances may be obtained in a state of great purity at a pressure which is dependent on the vapour pressure above the solvent of the said dissolved substances at the temperatures employed, and in particular substances which above pressures of for example 1 atmosphere may pass over from the solid state into the gaseous state without becoming liquid, may be brought to temperatures which lie above the sublimation temperature at the pressure prevailing in the gasification chamber, which may be for example 1 atmosphere.

In order to render the process more economical it is preferable to regenerate as far as possible the amount of cold employed for cooling the gases and the solvent and the amount of heat employed for expelling the gases in exchangers. The pure solvent which is recovered is preferably used again in circulation for the treatment of the initial mixture.

The nature of the solvent to be employed depends of course on the nature of the gas or gases intended to be removed from the gas mixture. For dissolving carbon dioxide or acetylene, acetone or ethyl alcohol may be used with advantage.

If the process is carried out in particular for the separation of the acetylene produced from hydrocarbons by the electric arc method, the concentration and purification of the acetylene according to the present invention may be combined in an economical manner with the purification of the hydrogen simultaneously formed in the electric arc by the usual strong cooling method.

The triple point of carbon dioxide is 56.6° below zero C. at a pressure of 1.5 atmospheres, that of acetylene is 81.5° below zero C. at 1.2 atmospheres.

The following examples given with reference to the accompanying drawing showing diagrammatically a vertical section of a plant suitable for the process according to the present invention will further illustrate the nature of this invention, but the invention is not restricted to these examples or to the specific arrangement shown in the drawing.

*Example 1*

In the production of acetylene from methane by the electric arc method a gas mixture is formed which contains hydrogen, nitrogen, methane and acetylene and also traces of other strongly unsaturated hydrocarbons, as for example diacetylene, allylene, allene and the like and ethylene, benzene and its polymers, hydrocyanic acid, and other substances some of which are still unknown. This gas mixture is compressed in the compressor A to a pressure of about 10 atmospheres. In the cooler B it is freed from water and lubricating oil in the usual manner. The gas mixture is then passed into the cooling apparatus C and D which may be cooled by the cold obtained in the process by cold exchange or also with special cooling agents such as liquid ammonia or ethane or ethylene and which in order to avoid interruptions of the process are so arranged that each of them may be excluded from the process and substituted by the other. The gas mixture cooled to a temperature of about 80° below zero centigrade enters the washing tower E at $a$ and is treated with acetone having a temperature of about 90° below zero centigrade and which is introduced into the tower at $b$. In order to avoid losses of heat the tower E is provided with special cooling means $c$, $d$ cooled with boiling ethylene. The gas mixture consisting of hydrogen, nitrogen and methane thus washed leaves the tower at $e$. The used solvent is withdrawn at the bottom of the tower and while releasing it from pressure is introduced by way of valve $f$ into the vessel F which is maintained at a temperature of 85° below zero centigrade. In this manner the greater part of the dissolved hydrogen, nitrogen and methane is evolved from the acetone. The gas mixture leaving the vessel F by pipe $g$ may be removed at $i$ or, if it is desired to recover valuable constituents eventually contained in this mixture it may be supplied again to the compressor after cold regeneration (not shown for sake of clearness) by way of pipe $h$. The solvent substantially freed from hydrogen, methane and nitrogen is then passed by way of valve $k$ to the tower M for expelling the dissolved acetylene. This tower may be constructed in any suitable manner, either as shown in the drawing or filled with Raschig rings. The heating of the tower M may be effected as illustrated by the warm solvent freed from gas which solvent leaving the pump O is introduced at $l$ into pipes arranged in the tower and flows in counter-current to the solvent to be degasified. Hot water or steam may also be supplied to the expelling tower. In case the degasified solvent is not sufficient for heating the tower, the heating may be combined with the condensation of the cooling agent required in the process. A gas mixture containing over 90 per cent of acetylene is evolved at $o$ at from 75° to 80° below zero centigrade, a mixture rich in allylene is evolved at $q$ at from 20° to 25° below zero centigrade and a gas rich in diacetylene is evolved at $r$ at 10° centigrade. The evolved gases are warmed to room temperature by cold exchange with fresh amounts of gas mixtures to be separated. The solvent freed from dissolved gases which flows off at the bottom of the tower M by way of pipe $t$ is cooled in cooler P brought by means of pump O to the pressure of the tower E, led through the expelling tower in the special tubes for cold exchange and after further cooling in coolers L and N is supplied to the tower E again. The mixture of hydrogen, nitrogen and methane not dissolved in the acetone which leaves the tower E at $c$ may be mixed with the part evolved from the solvent by releasing the pressure and worked up in the usual manner by strong cooling into pure hydrogen or a mixture of hydrogen and nitrogen for other purposes, as for example for the synthesis of ammonia or after warming by washing with middle oils it may be worked up into hydrogen insufficiently free from methane and used for hydrogenating purposes. The methane thus obtained may be subjected to an electric arc treatment again for the production of acetylene.

When working with pure acetone, this soon becomes unsuitable for the process by reason of the water vapour and other substances contained in the gas mixture which immediately freeze and are insoluble in acetone in the solid state. It is therefore preferable thoroughly to dry or purify the gas mixture to be treated before its entry into the separating apparatus. When acetylene is to be separated, this drying may be effected by leading the gas mixture over a sufficiently large amount of one or more of the carbides of the elements of the second group of the periodic system such as calcium carbide, strontium carbide or barium carbide.

In order to keep the acetone in a suitable state for the process, liquids which readily dissolve ice or other substances which separate out at low temperatures, as for example ethyl alcohol, may be added to the acetone to the extent of one fifth of the volume of the acetone. The acetone then remains completely clear and mobile at 80° below zero centigrade for a long time for example even when employing gases containing water vapour. The solvent power expressed by the ratio of dissolved and undissolved amounts of gas is about 175:1 for acetylene when employing the said mixture of alcohol and acetone at 50° below zero centigrade and is thus only slightly less than that of pure acetone at the same temperature (200:1). Pure alcohol may also be used as the separating liquid in the separation of acetylene. The mixture of acetone and alcohol or the alcohol must be dried from time to time, and the drying may be effected inside or outside the separating apparatus. Oxide or carbides of the elements of the second group of the periodic system, as for example calcium carbide or oxide, are preferably used for the drying.

*Example 2*

A mixture of gas which, in addition to hydrogen and nitrogen, contains about 10 per cent of carbon dioxide and 2 per cent of ethylene is treated with acetone at a temperature of 85° below zero centigrade and under a pressure of 10 atmospheres. The pressure on the solution is then released to atmospheric pressure, part of the dissolved hydrogen and nitrogen thus being caused to escape, whereupon the solution is supplied to a tower similar to the tower M shown in the drawing. At a temperature of about 78° below zero centigrade a gas mixture containing more than 90 per cent of carbon dioxide escapes, and at 20° below zero centigrade a gas mixture rich in ethylene. The escaping gases and the solvent freed from the dissolved gases and which are withdrawn at the bottom of the said tower are treated as described in Example 1.

What we claim is:

1. A process for the separation of acetylene from a gas mixture resulting from the treatment of a gas comprising methane in the electric arc, which comprises treating said gas with a solvent capable of dissolving acetylene, the said solvent having a temperature which is below the triple point of acetylene and selected from the class consisting of ethyl alcohol and acetone and then slowly heating said solvent.

2. A process for the separation of acetylene from a gas mixture resulting from the treatment of a gas comprising methane in the electric arc which comprises treating said gas with acetone having a temperature below the triple point of acetylene (81.5° below zero centigrade) and then slowly heating the solution in acetone thus obtained.

3. A process for the separation into its constituents of a gas mixture comprising acetylene, allylene, allene, ethylene, benzene and its polymers, hydrocyanic acid, hydrogen, nitrogen, methane and other substances, some of which are still unknown, which comprises compressing this gas mixture to about 10 atmospheres, cooling it to free it from water and lubricating oil, cooling it further to a temperature of about 80° below zero centigrade, washing the gas with acetone having a temperature of about 90° below zero centigrade, passing off the gas mixture of hydrogen, nitrogen and methane remaining after said washing treatment, releasing the pressure on the solution while maintaining a temperature of about 85° below zero centigrade thus setting free the greater part of the dissolved hydrogen, nitrogen and methane, heating up the remaining solution first to between 75° and 80° below zero centigrade to set free acetylene, heating it to 20 to 25° below zero centigrade to set free a gas mixture rich in allylene and heating it to 10° below zero centigrade to set free a gas rich in diacetylene.

PAUL BAUMANN.
HELMUT TANNEBERGER.
HEINRICH SCHILLING.